United States Patent
Creek et al.

(10) Patent No.: US 10,272,775 B2
(45) Date of Patent: Apr. 30, 2019

(54) TRANSMISSION OUTPUT SHAFT VIBRATION DAMPENER

(71) Applicant: GM GLOBAL TECHNOLOGY OPERATIONS LLC, Detroit, MI (US)

(72) Inventors: Steven W. Creek, Shelby Township, MI (US); James P. Dupre, Saint Clair Shores, MI (US); William C. Hayes, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 103 days.

(21) Appl. No.: 15/235,897

(22) Filed: Aug. 12, 2016

(65) Prior Publication Data

US 2018/0043771 A1   Feb. 15, 2018

(51) Int. Cl.
  *B60K 17/24*  (2006.01)
  *F16C 3/02*  (2006.01)
  *F16F 15/10*  (2006.01)

(52) U.S. Cl.
  CPC ............... *B60K 17/24* (2013.01); *F16C 3/02* (2013.01); *F16F 15/10* (2013.01); *F16C 2226/30* (2013.01); *F16C 2226/60* (2013.01); *F16C 2226/62* (2013.01); *F16C 2226/74* (2013.01); *F16C 2226/76* (2013.01); *F16C 2226/80* (2013.01); *F16C 2326/06* (2013.01)

(58) Field of Classification Search
  CPC ........ B60K 17/24; F16C 3/02; F16C 2226/80; F16C 2226/74; F16C 2226/76; F16C 2226/30; F16C 2226/60; F16C 2226/62
  See application file for complete search history.

(56) References Cited

U.S. PATENT DOCUMENTS

| | | | | |
|---|---|---|---|---|
| 2,514,136 A | * | 7/1950 | O'Connor | F16F 15/173 74/573.1 |
| 2,878,689 A | * | 3/1959 | Aebersold | B60K 17/22 74/574.4 |
| 2,961,894 A | * | 11/1960 | Oles | F16F 15/1442 29/450 |
| 3,320,771 A | * | 5/1967 | Roethlisberger | F16D 3/76 464/157 |
| 7,347,783 B2 | * | 3/2008 | Schmid | F16C 3/02 464/91 |
| 7,597,929 B2 | * | 10/2009 | Kyozuka | H05K 3/0058 427/117 |
| 2002/0139603 A1 | * | 10/2002 | Aiken | B60K 17/24 180/381 |
| 2004/0099087 A1 | * | 5/2004 | Breese | F16C 3/02 464/180 |
| 2007/0017768 A1 | * | 1/2007 | Alvarez | F16D 3/76 192/55.3 |
| 2009/0114492 A1 | * | 5/2009 | O'Leary | F16F 15/14 188/378 |

(Continued)

*Primary Examiner* — Darlene P Condra
(74) *Attorney, Agent, or Firm* — Cantor Colburn LLP

(57) ABSTRACT

A transmission includes a transmission housing having an output shaft flange including a central passage. An output shaft extends through the central passage. The output shaft defines a shaft axis and including an axial end portion. A vibration dampener is mounted to the axial end portion of the output shaft, and a mechanical fastener is received by the axial end portion of the output shaft. The mechanical fastener operatively connects the vibration dampener to the output shaft.

19 Claims, 10 Drawing Sheets

(56) References Cited

U.S. PATENT DOCUMENTS

2013/0255417 A1* 10/2013 Murao ................... F16H 1/12
                                                                               74/424
2016/0333942 A1* 11/2016 Watson ................... F16D 3/76

* cited by examiner

TRANSMISSION OUTPUT SHAFT VIBRATION DAMPENER

FIELD OF THE INVENTION

The subject invention relates to the art of vehicles and, more particularly, to a transmission output shaft vibration dampener for a vehicle.

BACKGROUND

Many vehicle owners prefer a quiet ride. As such, engineers explore various methods and systems that may reduce vibrations that could lead to an increase in noise perceivable to vehicle occupants. In some cases, vibration dampeners are mounted to rotating shafts in order to reduce vibrations. Mounting vibration dampeners onto shafts coupled to gear systems, for example, creates several challenges. Applying an axial force to a shaft that supports gears can result in gear misalignment, bearing misalignment or the like. Accordingly, it is desirable to provide a system for mounting dampeners to shafts that should avoid application of axial forces.

SUMMARY OF THE INVENTION

In accordance with an aspect of an exemplary embodiment, a transmission includes a transmission housing having an output shaft flange including a central passage. An output shaft extends through the central passage. The output shaft defines a shaft axis and including an axial end portion. A vibration dampener is mounted to the axial end portion of the output shaft, and a mechanical fastener is received by the axial end portion of the output shaft. The mechanical fastener operatively connects the vibration dampener to the output shaft.

In accordance with another aspect of an exemplary embodiment, a vehicle includes a chassis, a body supported by the chassis, and engine arranged in the body and supported by the chassis, and a transmission operatively coupled to the engine and supported by the chassis. The transmission includes a transmission housing having an output shaft flange including a central passage. An output shaft extends through the central passage. The output shaft defines a shaft axis and including an axial end portion. A vibration dampener is mounted to the axial end portion of the output shaft, and a mechanical fastener is received by the axial end portion of the output shaft. The mechanical fastener operatively connects the vibration dampener to the output shaft.

In accordance with yet another aspect of an exemplary embodiment, a method of securing a vibration dampener to an output shaft of a transmission includes passing an output receiving passage on the vibration dampener over the output shaft, and securing the vibration dampener to the output shaft with a mechanical fastener without applying an axial force to the output shaft.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
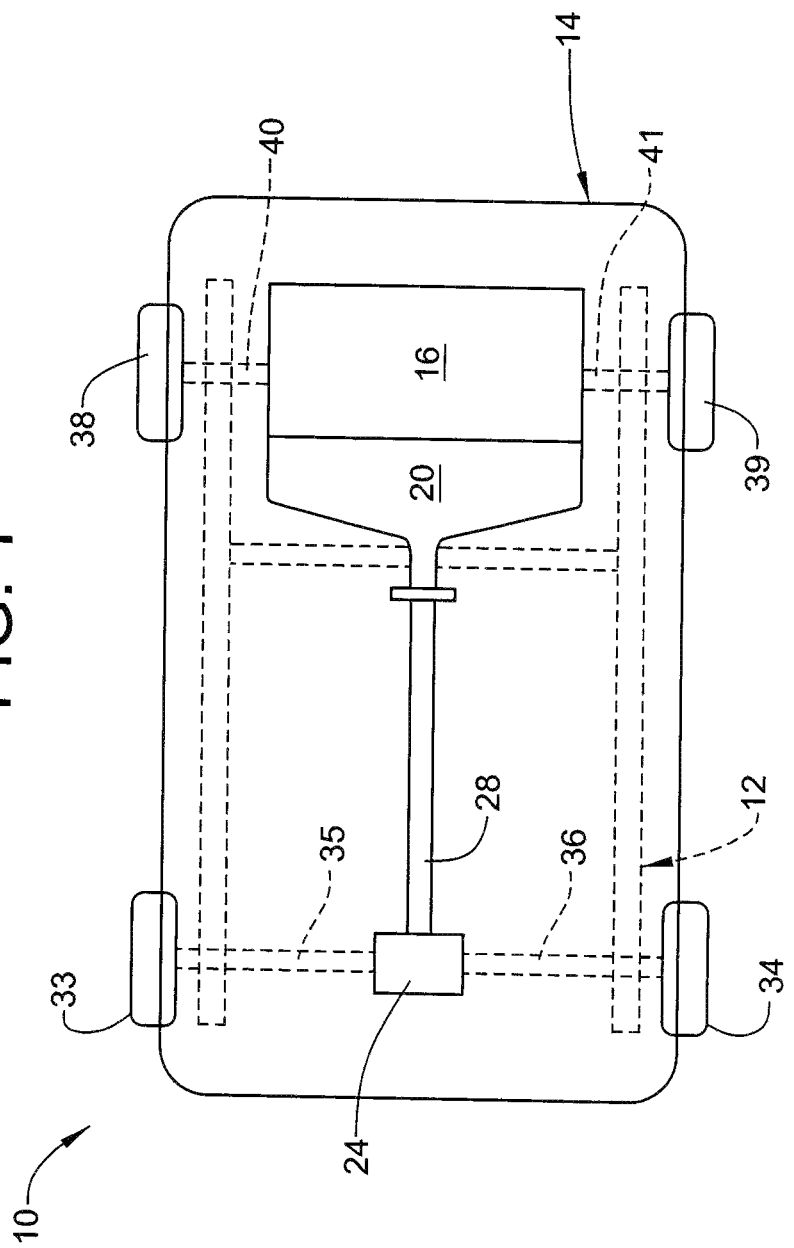
FIG. 1 depicts a vehicle having a transmission and vibration dampener mounted in accordance with an exemplary embodiment.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. Vehicle 10 includes a chassis 12 supporting a body 14. Chassis 12 also supports an engine 16 operatively connected to a transmission 20. Engine 16 may take the form of an internal combustion engine, an electric motor, or a hybrid electric/internal combustion engine. Transmission 20 may be mechanically linked to a rear differential 24 through a driveshaft 28. Vehicle 10 also includes first and second rear wheels 33 and 34 operatively connected to rear differential 24 by corresponding first and second rear axles 35 and 36. First and second front wheels 38 and 39 may be supported from chassis 12 through first and second front axles 40 and 41.

Figure 2:
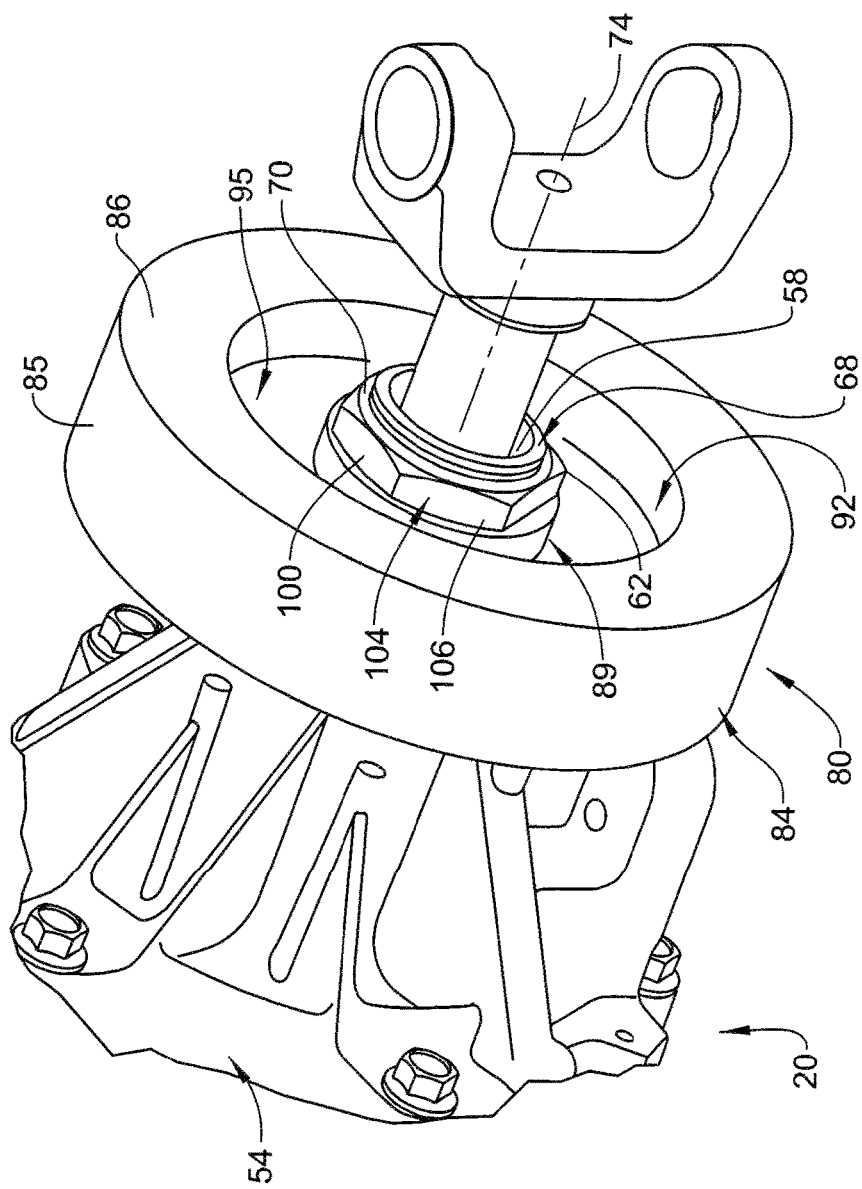
FIG. 2 depicts the vibration dampener of FIG. 1.
Figure 3:
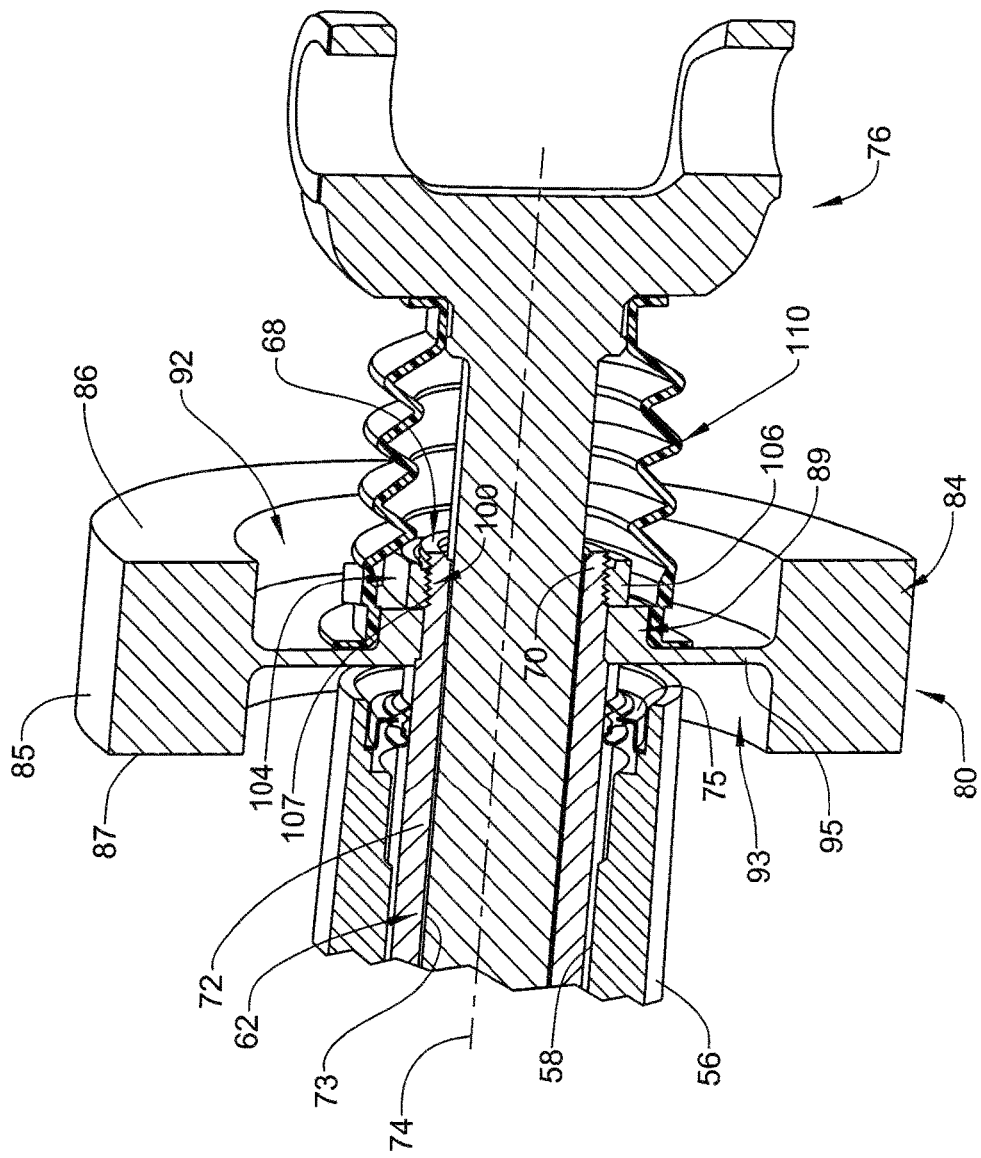
FIG. 3 depicts a partially cut away view of the vibration dampener of FIG. 2.

With reference to FIGS. 2 and 3, transmission 20 includes a transmission housing 54 having an output shaft flange 56 defining a central passage 58. An output shaft 62 extends from output shaft flange 56 through central passage 58. Output shaft 62 includes a first end (not shown) connected to a gear assembly (also not shown) and a second end 68 defining an axial end portion 70. An intermediate portion 72 includes a central passage portion 73 that extends between the first end and second end 68. Intermediate portion 72 defines a shaft axis 74. A seal 75 may be provided at output shaft flange 56 to prevent fluids from passing out of central passage 58 along output shaft 62. A prop shaft 76 extends through central passage portion 73 and outwardly from transmission housing 54. Prop shaft 76 may provide a mechanical link to driveshaft 28.

In accordance with an aspect of an exemplary embodiment, a vibration dampener 80 is mounted to axial end portion 70 of output shaft 62. Vibration dampener 80 includes a body 84 having an outer peripheral edge 85, a first surface 86, an opposing second surface 87 and a central hub 89. A first recess 92 is formed in first surface 86 and a second recess 93 is formed in second surface 87 defining a central web 95 that extends outwardly from central hub 89 toward outer peripheral edge 85.

In accordance with an aspect of an exemplary embodiment, axial end portion 70 includes a plurality of threads 100. Vibration dampener 80 is mounted and secured to output shaft 62 through a mechanical fastener 104 which may take the form of a lock nut 106 having threads 107 that engage with the plurality of threads 100 on axial end portion 70. Securing vibration dampener 80 with a mechanical fastener 104 eliminates axial forces on output shaft 62. That is, prior to the present invention, vibration dampeners have been press-fit onto output shafts such that axial forces associated with the press-fitting are applied to gears in the transmission and, as a result gear clearances and tolerances may be negatively affected. A boot 110 may extend over prop shaft 76 and connect with central hub 89. Boot 110 prevents egress of grease and ingress of dust, cinders and the like.

Figure 4:
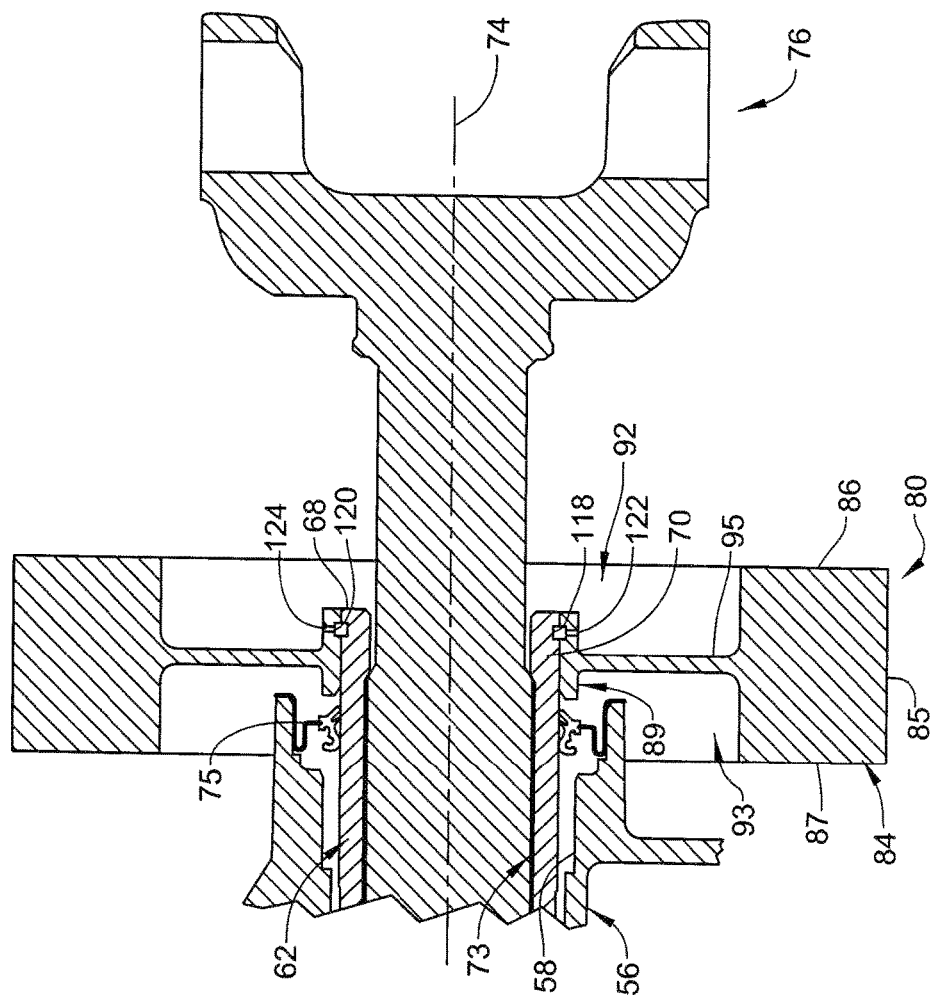
FIG. 4 depicts a vibration dampener mounted in accordance with another aspect of an exemplary embodiment.

Reference will now follow to FIG. 4, wherein like reference numbers represent corresponding parts and features, in the separate views. In accordance with an aspect of an exemplary embodiment, axial end portion 70 of output shaft 62 includes an external groove 118, and central hub 89 of vibration dampener 80 includes an internal groove 120. Internal groove 120 aligns with external groove 118 when vibration dampener 80 is installed to output shaft 62. A mechanical fastener 122 couples vibration dampener 80 to axial end portion 70.

In the exemplary embodiment shown, mechanical fastener 122 takes the form of a material (not separately labeled) injected into external groove 118 and internal groove 120 through one or more passages 124 that extend through central hub 89 substantially perpendicularly to shaft axis 74. Mechanical fastener 122 may take the form of a plastic, a metal, or a composite material that is heated and introduced into external groove 118 and internal grove 120 through passage(s) 124. Once injected, mechanical fastener 122 hardens creating a bond between vibration dampener 80 and axial end portion 70 without any application of axial loads to output shaft 62.

Figure 5:
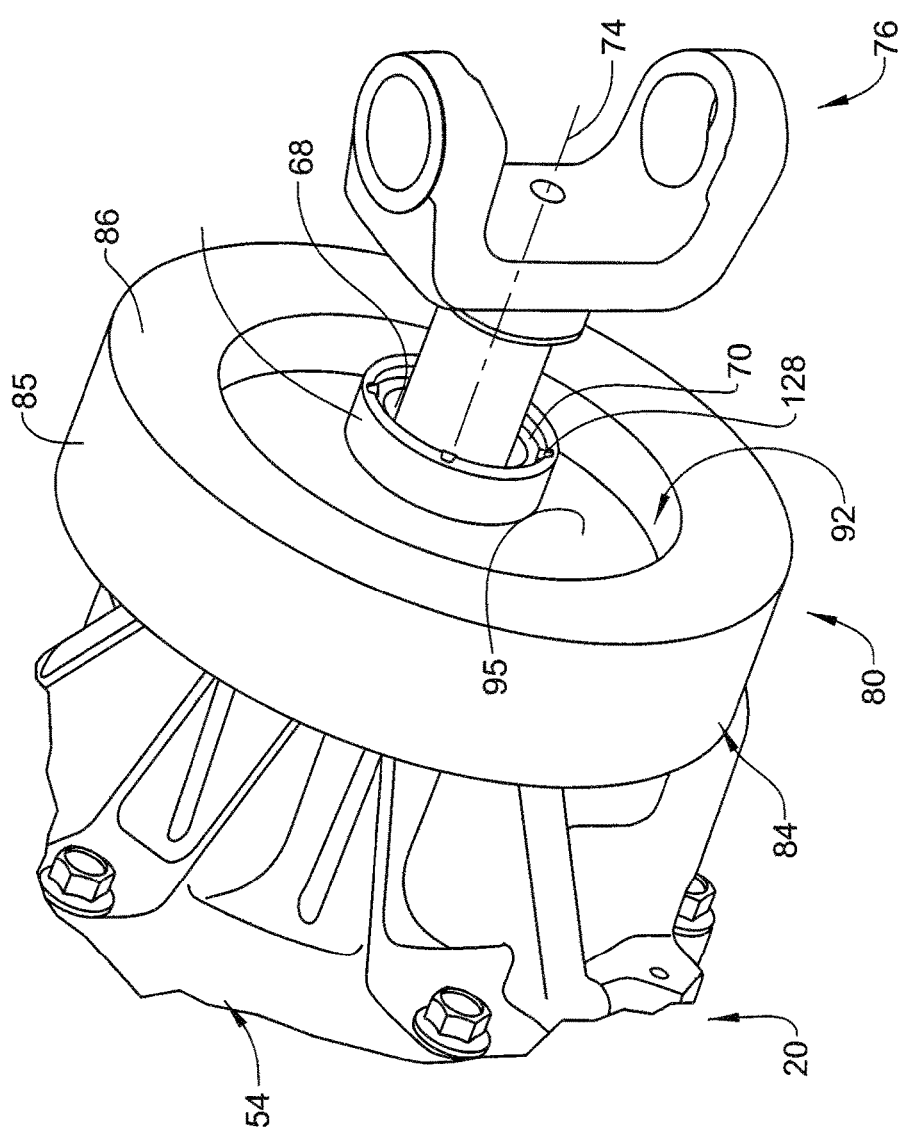
FIG. 5 depicts a vibration dampener mounted in accordance with yet another aspect of an exemplary embodiment.

Reference will now follow to FIG. 5, wherein like reference numbers represent corresponding parts, in the separate views. In accordance with an aspect of an exemplary embodiment, vibration dampener 80 is secured to axial end portion 70 of output shaft 62 through one or more staking elements 128. Staking elements 128 may be formed by an application of force to central hub 89 without generating any axial loading on output shaft 62. The application of force causes a portion of central hub 89 to deform and engage second end 68 of output shaft 62. The number and location of staking elements may vary.

Figure 6:
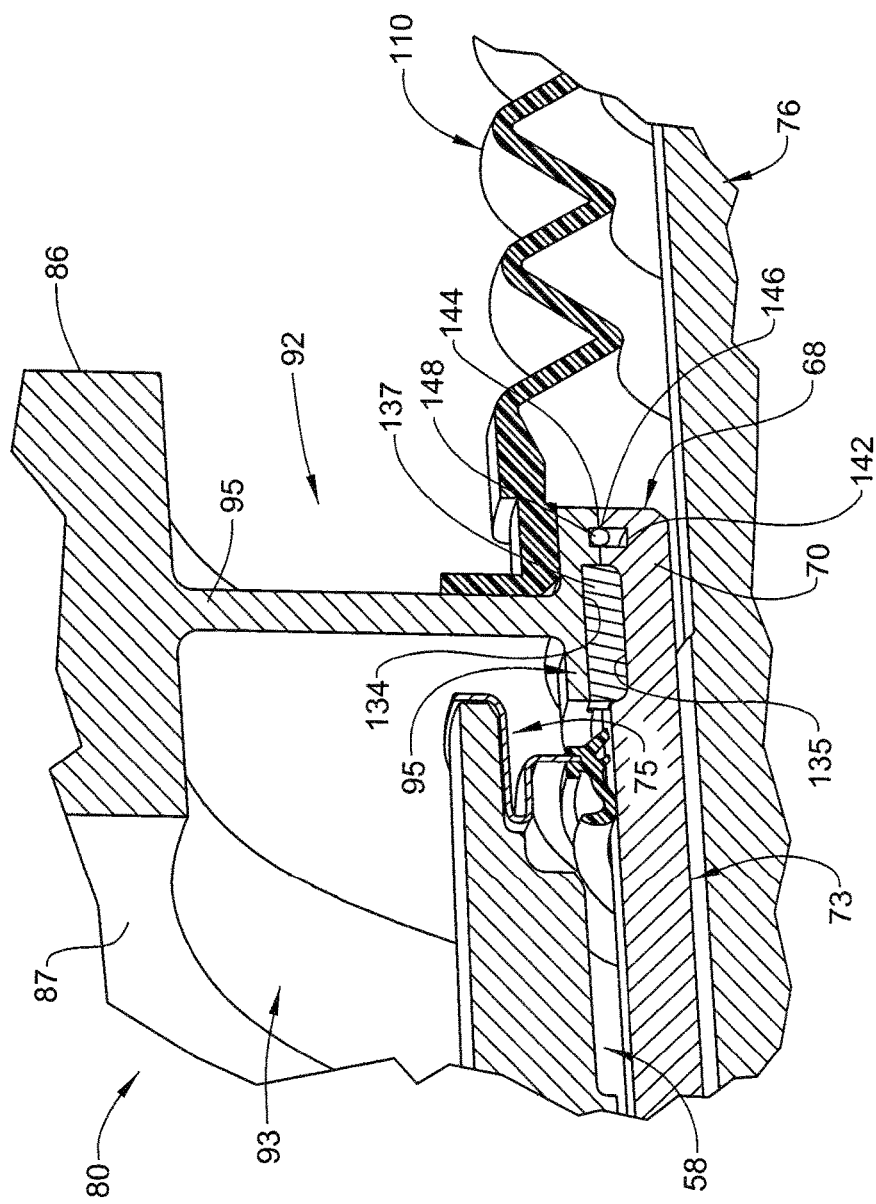
FIG. 6 depicts a vibration dampener mounted in accordance with still another aspect of an exemplary embodiment.

Reference will now follow to FIG. 6, wherein like reference numbers represent corresponding parts, in the separate views. In accordance with an aspect of an exemplary embodiment, axial end portion 70 may include a slot 134 that supports a key 137. A keyway 139 may be formed on an internal surface (not separately labeled) of central hub 89. Key 137 interacts with keyway 139 to prevent rotation or relative movement of vibration dampener 80 relative to output shaft 62. Of course, it should be understood that key 137 could be mounted to the internal surface of central hub 89.

Figure 7:
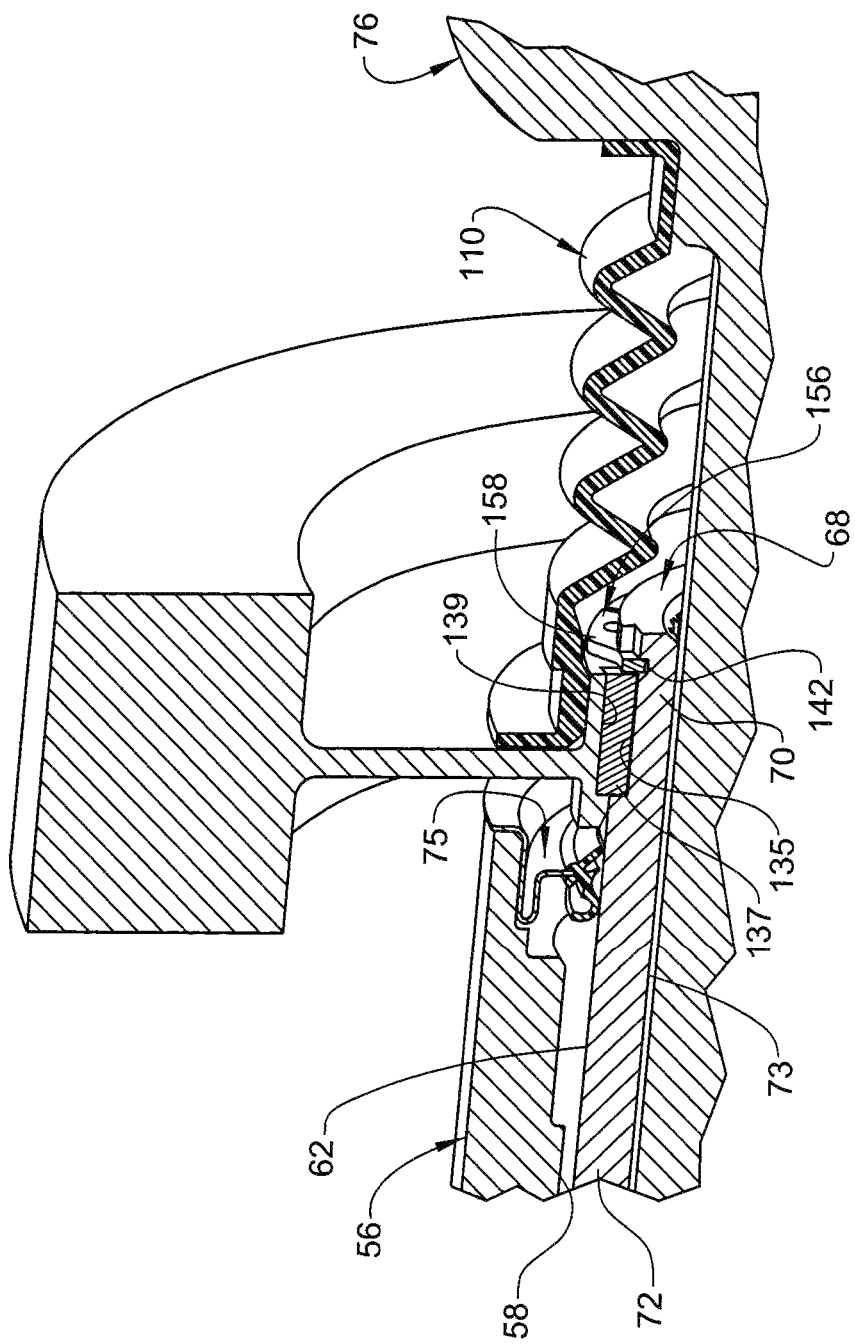
FIG. 7 depicts a vibration dampener mounted in accordance with yet still another aspect of an exemplary embodiment.

In further accordance with the exemplary aspect shown, axial end portion 70 includes an external groove 142 and central hub 89 includes an internal groove 144. Internal groove 144 aligns with external groove 142 when vibration dampener 80 is mounted to axial end portion 70 of output shaft 62. A mechanical fastener 146 secures vibration dampener 80 to axial end portion 70. Mechanical fastener 146 may take the form of a snap ring 148 arranged in external groove 142 that engages with internal groove 144. Alternatively, vibration dampener 80 may be axially secured to output shaft 62 through a mechanical fastener 156 such as that shown in FIG. 7 wherein like numbers represent corresponding parts in the separate views. In the exemplary aspect shown, mechanical fastener 156 takes the form of an external snap ring 158 arranged in external groove 142 and abuts second end 68 of output shaft 62.

Figure 8:
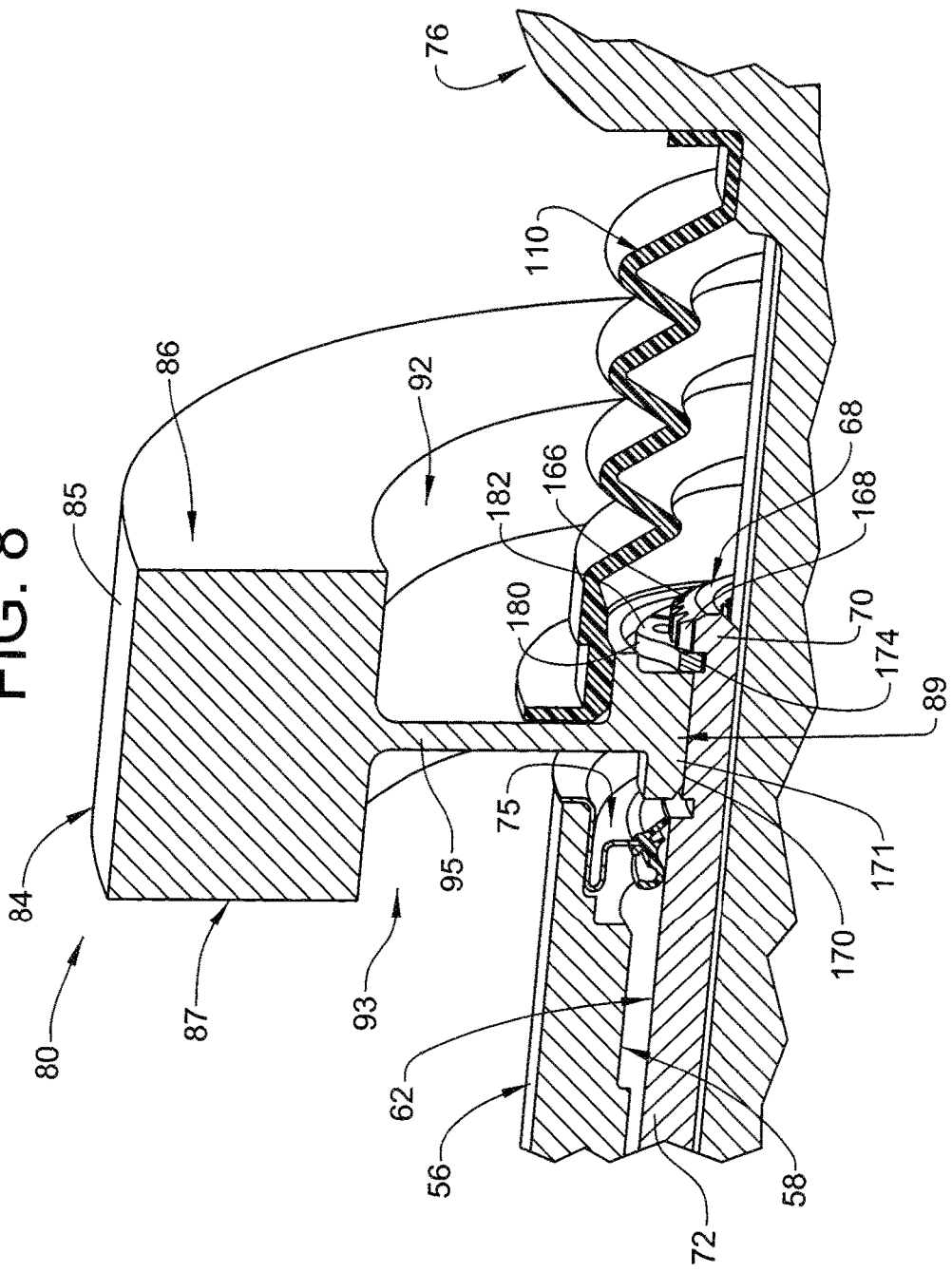
FIG. 8 depicts a vibration dampener mounted in accordance with still another aspect of an exemplary embodiment.

Reference will now follow to FIG. 8, wherein like reference numbers represent corresponding parts, in the separate views. In accordance with an aspect of an exemplary embodiment, axial end portion 70 includes an external surface 166 having formed therein a plurality of splines, one of which is indicated at 168. Central hub 89 includes an internal surface 170 having formed therein a plurality of grooves, one of which is indicated at 171. Plurality of splines 168 engage with plurality of grooves 171 to prevent rotation or relative movement of vibration dampener 80 and output shaft 62. In addition, axial end portion 70 includes an external groove 174 that receives a mechanical fastener 180 which axially secures vibration dampener 80 to output shaft 62. Mechanical fastener 180 may take the form of an external snap ring 182 that abuts hub 89.

Figure 9:
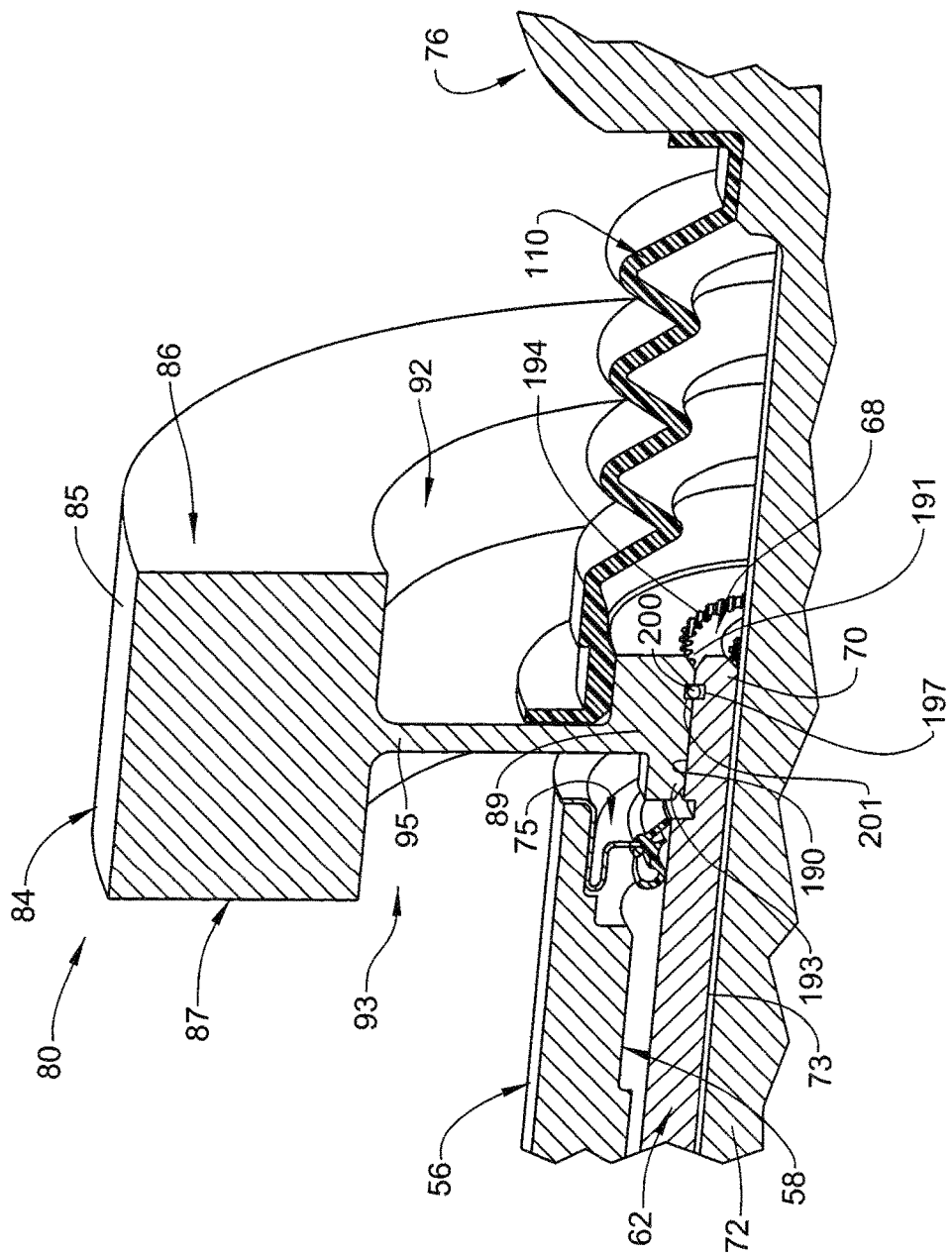
FIG. 9 depicts a vibration dampener mounted in accordance with still yet another aspect of an exemplary embodiment.

Reference will now follow to FIG. 9, wherein like reference numbers represent corresponding parts, in the separate views. In accordance with an aspect of an exemplary embodiment, axial end portion 70 includes an external surface 190 having formed thereon a plurality of splines 191. Central hub 89 includes an internal surface 193 having formed thereon a plurality of grooves 194. Plurality of splines 191 engage with plurality of grooves 194 to prevent rotation or relative movement of vibration dampener 80 and output shaft 62.

In addition, axial end portion 70 includes an external groove 197 and central hub 89 includes an internal groove (not separately labeled). The internal groove aligns with external groove 198 when vibration dampener 80 is mounted to output shaft 62. A mechanical fastener 200 shown in the form of a snap ring 201 is arranged in external groove 197 and engages into the internal groove to axially secure vibration dampener 80 to axial end portion 70 without applying axial forces to output shaft 62.

Figure 10:
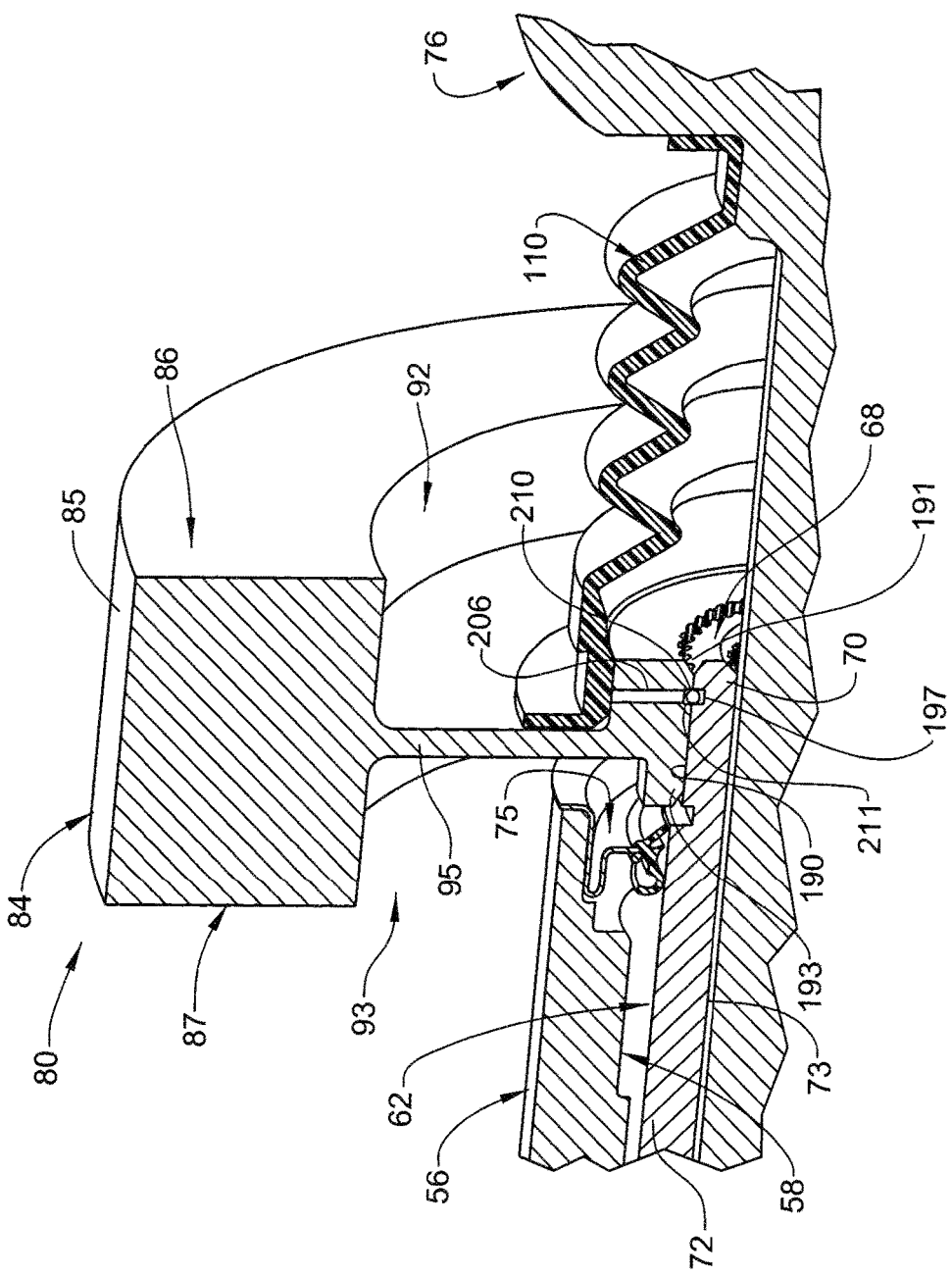
FIG. 10 depicts a vibration dampener mounted in accordance with yet still another aspect of an exemplary embodiment.

As shown in FIG. 10, wherein like reference numbers represent corresponding parts and features in the respective views, one or more passages, such as shown at 206 may be formed in central hub 89. Passage(s) 206 extend substantially perpendicularly relative to shaft axis 74. Passage(s) 206 allow for a mechanical fastener 210 to be injected into external groove 197 and the internal groove to form a snap ring 211. Mechanical fastener 210 maintains vibration dampener 80 to axial end portion 70 without the need for an application of axial force to output shaft 62.

At this point, it should be understood that the exemplary embodiments describe various mechanical fasteners employed to secure a vibration dampener to an output shaft of a transmission. In accordance with the exemplary aspects, the use of the exemplary mechanical fasteners remove the need for an axial force to be applied to the output shaft such as would otherwise occur when establishing an interference fit. Avoiding the application of axial forces to the output shaft prolongs, likewise eliminates, axial forces that could negatively impact gear clearances, gear alignments and the like thereby increasing an overall operational life of the transmission.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A transmission comprising:
a transmission housing having an output shaft flange including a central passage;
an output shaft extending through the central passage, the output shaft defining a shaft axis and including an axial end portion;
a vibration dampener mounted to the axial end portion of the output shaft;
a mechanical fastener received by the axial end portion of the output shaft, the mechanical fastener operatively connecting the vibration dampener to the output shaft; and
a prop shaft extending through the output shaft and the vibration dampener.

2. The transmission according to claim 1, wherein the axial end portion of the output shaft includes a plurality of threads, the mechanical fastener comprising a lock nut mechanically engaged with the plurality of threads.

3. The transmission according to claim 1, wherein the vibration dampener includes a central hub including an internal groove and the axial end portion of the output shaft includes an external groove, the mechanical fastener being arranged in each of the internal groove and the external groove operatively connecting the vibration dampener to the output shaft.

4. The transmission according to claim 3, wherein the central hub includes one or more passages extending substantially perpendicularly to the shaft axis and connecting with the internal groove, the mechanical fastener comprising a plastic ring injected into the internal groove and the external groove through the one or more passages.

5. The transmission according to claim 3, wherein the mechanical fastener comprises a snap ring.

6. The transmission according to claim 1, wherein the axial end portion of the output shaft includes an external groove, the mechanical fastener comprising a snap ring arranged in the external groove axially outwardly of the vibration dampener.

7. The transmission according to claim 1, wherein the vibration dampener includes a central hub, the mechanical fastener comprising a staking element formed in the central hub securing the vibration dampener to the output shaft.

8. The transmission according to claim 1, wherein the vibration dampener includes a central hub, wherein one of the central hub and the axial end portion of the output shaft supports a key and the other of the central hub and the axial end portion of the output shaft includes a keyway, the key cooperating with the keyway to restrain rotation of the vibration dampener relative to the output shaft.

9. The transmission according to claim 1, wherein the vibration dampener includes a central hub having an internal surface and the axial end portion of the output shaft includes an external surface, the internal surface including a plurality of grooves and the external surface including a plurality of splines, the plurality of splines being received by the plurality of grooves to restrain rotation of the vibration dampener relative to the output shaft.

10. A vehicle comprising:
a chassis;
a body supported by the chassis;
an engine arranged in the body and supported by the chassis; and
a transmission operatively coupled to the engine and supported by the chassis, the transmission comprising:
a transmission housing having an output shaft flange including a central passage;
an output shaft extending through the central passage, the output shaft defining a shaft axis and including an axial end portion;
a vibration dampener mounted to the axial end portion of the output shaft;
a mechanical fastener received by the axial end portion of the output shaft, the mechanical fastener operatively connecting the vibration dampener to the output shaft; and
a prop shaft extending through the output shaft and the vibration dampener.

11. The transmission according to claim 10, wherein the axial end portion of the output shaft includes a plurality of threads, the mechanical fastener comprising a lock nut mechanically engaged with the plurality of threads.

12. The transmission according to claim 10, wherein the vibration dampener includes a central hub including an internal groove and the axial end portion of the output shaft includes an external groove, the mechanical fastener being arranged in each of the internal groove and the external groove operatively connecting the vibration dampener to the output shaft.

13. The transmission according to claim 12, wherein the central hub includes one or more passages extending substantially perpendicularly to the shaft axis and connecting with the internal groove, the mechanical fastener comprising a plastic ring injected into the internal groove and the external groove through the one or more passages.

14. The transmission according to claim 12, wherein the mechanical fastener comprises a snap ring.

15. The transmission according to claim 10, wherein the axial end portion of the output shaft includes an external groove, the mechanical fastener comprising a snap ring arranged in the external groove axially outwardly of the vibration dampener.

16. The transmission according to claim 10, wherein the vibration dampener includes a central hub, the mechanical fastener comprising a staking element formed in the central hub securing the vibration dampener to the output shaft.

17. The transmission according to claim 10, wherein the vibration dampener is constrained from rotating relative to the output shaft.

18. A method of securing a vibration dampener to an output shaft of a transmission comprising:
passing an output receiving passage on the vibration dampener over the output shaft;
securing the vibration dampener to the output shaft with a mechanical fastener without applying an axial force to the output shaft; and
installing a prop shaft through the output shaft.

19. The method of claim 18, wherein securing the vibration dampener with the mechanical fastener includes attaching one of a lock nut, a snap ring, and a staking element to the output shaft.

* * * * *